United States Patent [19]
Kasprzyk et al.

[11] Patent Number: 6,016,557
[45] Date of Patent: Jan. 18, 2000

[54] METHOD AND APPARATUS FOR NONINTRUSIVE PASSIVE PROCESSOR MONITOR

[75] Inventors: Marlon Zbigniew Kasprzyk, Winfield; Paul K. Wolfe, Naperville, both of Ill.

[73] Assignee: Lucent Technologies, Inc., Murray Hill, N.J.

[21] Appl. No.: 08/938,438

[22] Filed: Sep. 25, 1997

[51] Int. Cl.[7] .................................................. G06F 11/00
[52] U.S. Cl. ............................................................ 714/38
[58] Field of Search ................................. 714/38, 37, 39; 395/704, 701; 364/267.91

[56] References Cited

U.S. PATENT DOCUMENTS

| | | | |
|---|---|---|---|
| 4,953,084 | 8/1990 | Meloy et al. | 395/704 |
| 5,179,702 | 1/1993 | Spix et al. | 395/650 |
| 5,228,039 | 7/1993 | Knoke et al. | 395/183.04 |
| 5,321,828 | 6/1994 | Phillips et al. | 395/500 |
| 5,357,628 | 10/1994 | Yuen | 395/183.1 |
| 5,410,685 | 4/1995 | Banda et al. | 395/575 |
| 5,581,695 | 12/1996 | Knoke et al. | 395/183.04 |
| 5,713,010 | 1/1998 | Buzbee et al. | 395/507 |
| 5,815,653 | 9/1998 | You et al. | 395/701 |
| 5,859,963 | 1/1999 | O'Dowd et al. | 395/183.14 |
| 5,884,023 | 3/1999 | Swoboda et al. | 714/30 |

OTHER PUBLICATIONS

Clemencon et al., "The "Annai" environment for portable distributed parallel programming" System Sciences, vol. III, Proc. of the 28th Hawaii Intl Conf, pp. 242–251, Jan. 1995.

Snyder et al., "Tools for real–time signal–processing research" IEEE Communications Magazine, pp. 64–74, Nov. 1993.

*Primary Examiner*—Robert W. Beausoliel, Jr.
*Assistant Examiner*—Stephen C. Elmore

[57] ABSTRACT

A source code monitor and method is provided having an interface for monitoring the execution of a source coded computer program by a processor. The monitor provides for nonintrusively detecting the actions taken by the processor while executing the source coded program, and determining during execution of the source program by the processor if there is a match between the actions as detected and an associated part of the source code. A display is provided for an indication of the actions performed and, if there is a match, an indication of the associated part of the source code. If there is not a match, an indication that there is not a match is provided. The interface circuit monitors signals on the target processor address bus, data bus and control bus. A code coverage analyzer box connects these signals to a code representing the process or action taken during each transition cycle and a local, or remote network connected, code coverage analysis server compares the action to a set of possible actions which can be taken by the processor with the associated set of symbols representative of the different parts of the user code.

42 Claims, 12 Drawing Sheets

NOTE:
SYMBOL TABLE BUILD (STEPS 130 AND 132) TAKES PLACE ONLY UPON NEW SOFTWARE ISSUE

LEGEND

CCABI - CODE COVERAGE ANALYSIS BOX INTERFACE
CCAB - CODE COVERAGE ANALYSIS BOX
CCAS - CODE COVERAGE ANALYSIS SERVER
PSS - PROGRAMMERS SUPPORT SYSTEM

FIG. 8A

| ELAPSED TIME MSEC | TRANSACTION TIME MSEC | PROCESSOR ACTION | ADDRESS-DATA VALUE | SOURCE CODE INDICATION |
|---|---|---|---|---|
| 0.000730 | 0.000730 | ARQUT | 0170b640 | AUptichk[128] |
| 0.000930 | 0.000200 | 1RQUT | 200112640 | 2f0b2f0a |
| 0.001050 | 0.000120 | 2RQUT | 41ee0008 | 50882f20 |
| 0.003280 | 0.002230 | ARQUT | 010a1c20 | TV |
| 0.003480 | 0.000200 | 1RQUT | 01705542 | 4ef9016f |
| 0.003600 | 0.000120 | 2RQUT | 13244ef9 | 0172771a |
| 0.007960 | 0.004360 | ARQUT | 01805e00 | DBrchkke[39] |
| 0.008160 | 0.000200 | 1RQUT | 48c04c3c | 08000000 |
| 0.008280 | 0.000120 | 2RQUT | 0030223c | 01556938 |
| 0.009580 | 0.001300 | ARLMD | 01c3d000 | .Smmmutt |

152 — ELAPSED TIME; 154 — TRANSACTION TIME; 156 — PROCESSOR ACTION; 158 — ADDRESS-DATA VALUE; 160 — SOURCE CODE INDICATION

| FIELD | ACTIVITY | CODE/MEANING |
|---|---|---|
| F1 | BUS PHASE | A - ADDRESS PHASE<br>1 - FIRST DATA PHASE<br>2 - SECOND DATA PHASE |
| F2 | BUS ACTION | R - READ<br>W - WRITE<br>C - CALL<br>E - ENTRY<br>X - EXIT |
| F3 | SIZE OF DATA MOVED ACROSS THE BUS | B - BYTE<br>W - WORD<br>L - LONG<br>Q - QUAD LONG, LINE |
| F4 | TEXT/DATA TYPE-COMMAND FUNCTION | UT - USER TEXT<br>UD - USER DATA<br>UQ - USER MOVE 16<br>ST - SUPERVISOR TEXT<br>SD - SUPERVISOR DATA<br>SQ - SUPERVISOR MOVE 16<br>BA - BREAKPOINT ACKNOWLEDGE<br>CP - DATA CACHE PUSH<br>MT - MMU TABLE SEARCH <TEXT><br>MD - MMU TABLE SEARCH <DATA><br>LN - ALT.LOGICAL FUNCTION CODE<br>IN - INTERRUPT LEVEL n; $1<=n<=7$<br>                n=1, 3, 4, 7<br>?? - UNKNOWN OR ILLEGAL, ONLY IF SAMPLE CLOCKING IS INTERNAL |

FIG. 9

| ELAPSED TIME | TRANSACTION TIME | PROCESSOR ACTION | ADDRESS-DATA VALUE | SOURCE CODE INDICATION |
|---|---|---|---|---|
| 0.639110 | 0.000170 | ARQST | 015e10c0 | OSdisp[390] |
| 0.639300 | 0.000190 | 1RQST | 4e754e56 | fff848e7 |
| 0.639420 | 0.000120 | 2RQST | 1c20262e | 00084a83 |
| 0.640210 | 0.000790 | ARLMD | 01c3d000 | .SMmmutt |
| 0.640410 | 0.000200 | 1RLMD | 01c3d20b | |
| 0.640670 | 0.000260 | ARLMD | 01c3d350 | .SMmmutt |
| 0.640860 | 0.000190 | 1RLMD | 01c45a0b | |
| 0.641230 | 0.000370 | ARQUD | 015277e6 | .OSstk1 |
| 0.641430 | 0.000200 | 1RQUD | 77ee015e | 560e0000 |
| 0.641550 | 0.000120 | 2RQUD | 00000152 | 01520152 |
| 0.641710 | 0.000160 | AWQCP | 0100cfe0 | .S-20 |
| 0.641880 | 0.000170 | 1WQCP | 00000010 | 00260000 |
| 0.642030 | 0.000150 | 2WQCP | 01ffe3d4 | 02fa3024 |
| 0.642200 | 0.000170 | ARQUT | 015e5608 | OSlites[27] |
| 0.642450 | 0.000250 | 1RQUT | 4eb9010a | 4b165243 |
| 0.642570 | 0.000120 | 2RQUT | 42430c43 | 00646caa |
| 0.642740 | 0.000170 | ARQUT | 015e5610 | OSlites[29] |

METHOD AND APPARATUS FOR NONINTRUSIVE PASSIVE PROCESSOR MONITOR

BACKGROUND OF THE INVENTION

1. Field of the Invention

The invention relates to an apparatus and method for software monitoring.

2. Related Art

A computer controlled system runs in accordance with software stored in program memory. In order to maintain the integrity of the system, the execution of software by the computer must be effective and efficient. Ordinarily, as the computer executes the software, the original software language in which the program is composed, or source code, is converted by a compiler into a lower level, i.e. less abstract, mnemonic language, machine language or object code. The source code is converted into mnemonic language (object code) because the processors in a computer controlled system cannot act immediately on the source code. Rather the processor can only act on the object code. After the computer converts the source code to object code, the processor initiates and takes action on its three principal buses, the address bus, data bus, and control bus, to perform the functions required by the source code. The address bus is an internal electronic channel interconnecting the processor to a random access memory (RAM) along which the addresses of memory storage locations are transmitted to identify which code stored in memory will come into play during execution. Data is sent back and forth between the memory and the processor. The control bus carries the output signals used to control the apparatus being controlled by the processor.

Sometimes, the output at the processor does not match the function for which the source code coded. This can occur when so-called "wild-write errors", "execution leg errors", "logical flow errors", or other "bugs" occur in the control software. Errors are not always apparent from the output. Even when a problem is shown in the final output, the output does not reveal where in the source code the error occurred or if there is a compiling error. System faults or system behavior errors adversely affect the quality of the entire system; therefore, it is important to monitor execution of software to ascertain software efficiency and to identify and diagnose software bugs or other errors in the code so they may be removed from the program.

Existing software monitoring is achieved by sections of diagnostic code in the software program itself monitoring its execution. However, underlying software malfunctions can cause the diagnostic software to also malfunction. Other software diagnostic programs, referred to as code coverage, or code profiling, programs, such as diagnostic programs known in the market as CASE, QFD, SEI, and VFSM, perform diagnostics. Disadvantageously, because code coverage programs "instrument" the target object code by inserting diagnostic code or instructions into the source code being monitored, execution time is increased. As the computer software object code is read in sequential linear fashion, the diagnostic instructions inserted into the programs must also be read. For every line of code that the processor reads, the time needed to execute coded function adds to the total time of execution. While this increased execution time may be acceptable for off-line, or nonreal-time systems, this increased execution time is intolerable in many real-time systems.

Another problem with known code coverage programs is that they cannot be used in control systems in which the program is fully embedded in the processor memory such as is done with the processors used in many real-time control applications. Accordingly, no diagnostic code can be added into the embedded system and any attempt to exceed the capacity of the embedded program memory can cause the system to crash or cause a panic condition.

Circuit emulators are known which do not require insertions of diagnostic code into the code being monitored, but the output results are expressed only in object code and are therefore cumbersome to use. Also, in order for the circuit emulators to work, the processor being monitored, i.e. the target processor, has to be fully functional and operating.

Disadvantageously, in known monitors, monitoring is restricted to monitoring only one of a supervisor code and a user code so that problems arising from transfers between user code activity and supervisor code management activities are not readily detected.

Other disadvantages with known code coverage or monitors exst. Failure to precisely measure the elapsed time and time duration of functions being executed in real-time makes certain timing errors difficult to detect. The inability in known code monitors to maintain the actual waveform generated by the processor in order to detect hardware related problems is also lacking. Lack of sufficient memory to store large numbers of signals both before and after occurrence of trigger events also makes detection of programming errors more difficult.

The present invention is directed to overcoming or at least reducing the effects of one or more of the problems set forth above.

SUMMARY OF THE INVENTION

The source code monitor and monitor method of the present invention overcomes the problems and disadvantages of the prior art through provision of a monitor which is nonintrusive and thus well adapted for use in monitoring processors with fully embedded programs and which is capable of determining and displaying real-time actions taken by a processor and the corresponding part of the source code associated with these actions.

In the preferred embodiment the source code monitor has an interface for a monitoring the execution of an object coded computer program by a processor. The monitor provides for nonintrusively (i.e. passively) detecting the actions taken by the processor while executing the object coded program, and determining during execution of the source program by the processor if there is a match between the actions as detected and an associated part of the object code. A display is provided for an indication of the actions performed and, if there is a match, an indication of the associated part of the source code. If there is not a match, an indication that there is not a match is provided. The interface circuit monitors signals on the target processor address bus, data bus and control bus. A code coverage analyzer box connects these signals to a code representing the process or action taken during each transition cycle and a local, or remote network connected, code coverage analysis server compares the action to a set of possible actions which can be taken by the processor with the associated set of symbols representative of the different parts of the user code.

In addition to displaying an encoded form of the actions taken along with identification of the associated user code, the elapsed time since commencement of a transaction cycle and the time duration of each transition cycle monitored is determined and displayed.

Advantageously, the actual waveforms of the signals on the target processor busses are stored and made available for display in order to facilitate detection of hardware related problems. In addition, recirculating memories are sufficiently large to enable restriction of memory transition cycles both after and before the occurrence of triggering events to facilitate analysis.

Any of the processor actions associated with the source code and detection of actions which are not connected with the source code are selectable as trigger events. Because the triggering events are not placed in the object code, no concern need be given to the effect on timing in real-time applications and triggering events can occur at any time during execution of the object code even when the processor is not functioning in a fully "pumped" operational mode.

These and other features of this invention will become apparent from the following detailed description, the accompanying drawings and the appended claims.

BRIEF DESCRIPTION OF THE DRAWINGS

The advantages of this invention will become apparent upon reading the following detailed description and upon reference to the drawings in which:

FIG. 8A is an example of the preferred form of the output results produced by the source code monitors of FIGS. 1 and 6A;

FIG. 8B is an encoder/decoder chart of a code used to express processor activity in the output results of FIG. 8A;

FIG. 9 is another example of the preferred form of the output results produced by the source code monitor.

DETAILED DESCRIPTION

Figure 1:
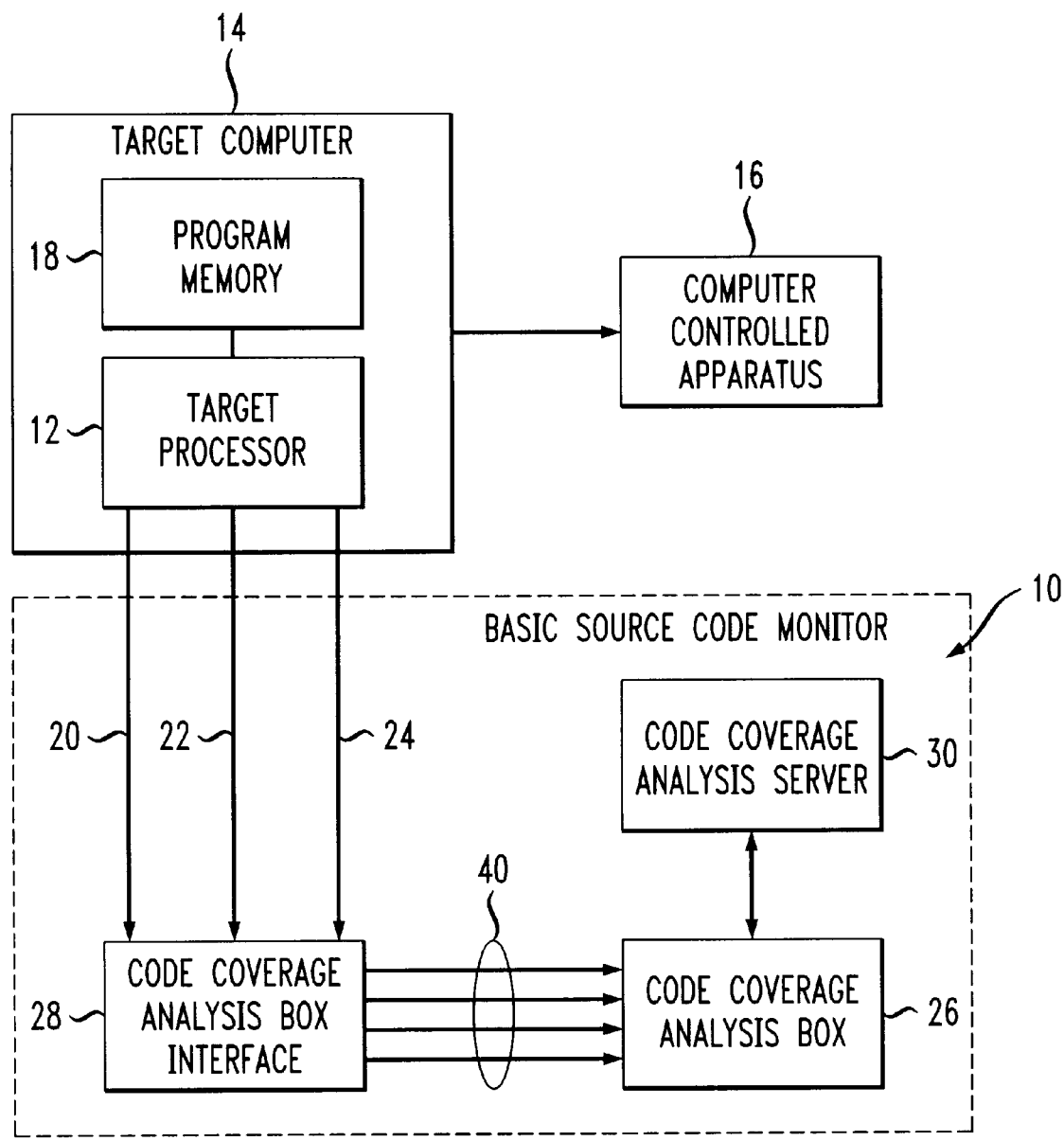
FIG. 1 is a functional block diagram of a preferred embodiment of the basic form of the source code monitor of the present invention as used to monitor an on-site target processor.

Referring to FIG. 1, a preferred embodiment of a relatively basic, or "stand alone", form of the source code monitor 10 of the present invention is connected with a target processor 12 of a target computer 14 being used to control a computer controlled apparatus 16 in accordance with a computer program, or software, stored in a program memory 18. For example, target computer 14 and the computer controlled apparatus 16 form part of a telephonic switching module, such as a 5ESS™ Switching Module 2000 made by LUCENT TECHNOLOGIES® and shown in at http:\\www.lucent.com\netsys\5ESS\5esswtch.html in which the software is embedded in memory. In such case, the target processor is an MC68040® microprocessor made by MOTOROLA, INC.®.

The target processor 12 has three primary busses upon which are performed or substantially all processor activity. These three busses, an address bus 20, a data bus 22, and a control bus 24 are coupled to a code coverage analysis box 26 through a code coverage analysis box interface, or interface circuit, 28. The code coverage analysis box 26, in turn, is connected with a code coverage analysis server computer 30 at which the monitor output information is produced and displayed, examples of which are shown in FIGS. 8A and 9.

Figure 2A:
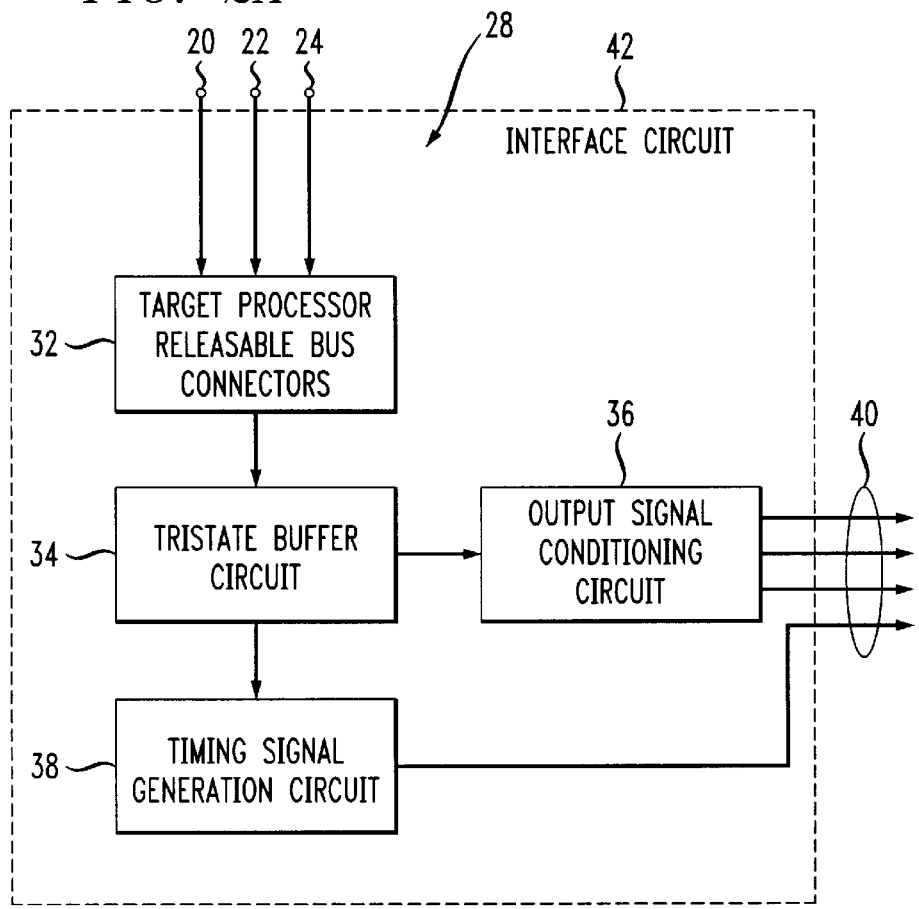
FIG. 2A is a functional block diagram of the code coverage analysis box interface of the monitor of FIG. 1.

Referring to FIG. 2A, the interface circuit 28 includes target processor releasable bus connectors 32, as symbolically represented by bus lines 20, 22 and 24, for releasable connection with mating connectors of the target processor 12 to interconnect signals from target processor 12 with a tristate buffer circuit 34. The tristate buffer circuit 34 functions to reduce inductive and capacitive loading before the signals from the target processor 12 are applied to an output signal conditioning circuit 36 and a timing signal generation circuit 38. The output signal conditioning circuit 36 conditions the tristate buffered target processor signals and the timing signal generation circuit 38 generates timing signals to facilitate recognition of the states, or actions, of the processor. The output signals from the output signal conditioning circuit 38 and the timing signal generation circuit 38 are coupled to the code coverage analysis box 26 via interface output cable 40, as also shown in FIG. 1. All of the components of the interface circuit 28 are preferably mounted on and interconnected by pin connectors on a circuit board 42 schematically illustrated by broken line.

Figure 2B:
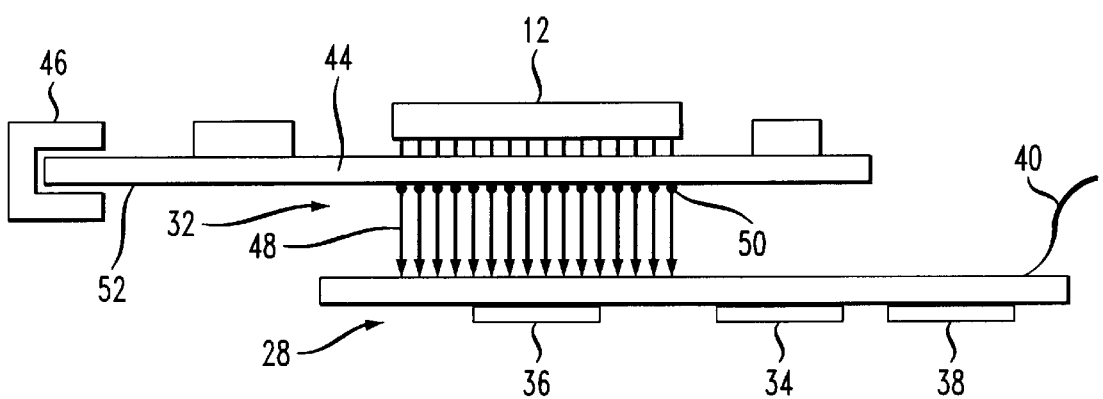
FIG. 2B is a schematic side view illustration of the code coverage analysis box interface mounted on a printed circuit board and interconnected with another printed circuit board upon which the target processor is mounted.

Referring to FIG. 2B, in the case of the target processor 12 being mounted on a printed circuit board 44 connected to other circuitry (not shown) via a back plane connector 46 and having extension pin receptors 50, the interface circuit board 42 makes appropriate connection via a plurality of connector pin extenders 48 inserted into mating receptors 50 located in a preselected pattern across a lower face 52 of the printed circuit board 44 defining a connector "footprint". The plurality of pin extenders 48 define the target processor releasable bus connectors 32 shown in functional block form in FIG. 2A as being connected with busses 20, 22 and 24. Each bus requires multiple connections via a plurality of the pin connectors 48. The interface output cable 40 of FIG. 2A is preferably a ribbon cable as shown in FIG. 2B which couples the interface circuit 28 to the code coverage analysis box 26.

The code coverage analysis box 26 is preferably implemented with a logic analyzer, preferably a TEKTRONIX® TLA 510 logic analyzer. The TLA 510 logic analyzer is described in detail at http:\\www.Tek.com. Briefly, referring to FIG. 3, it acquires information at high speed with a real time data acquisition circuit 53 which enables monitoring the interfaced target processor signals on cable 40 in real time. The acquired information is preferably stored in the form of "hardware traces" in a recirculating memory 54 having a memory capacity sufficient to store 32 k, 128 k, 512 k, or 2 MB. All or a portion of the recirculating memory is selectively transferred to the code coverage analysis server 30 via an output 56 upon the occurrence of preselected trigger events.

Figure 3:
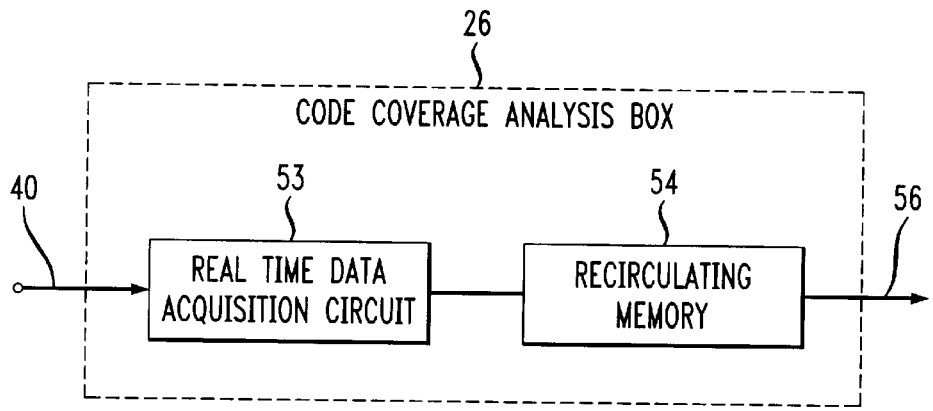
FIG. 3 is a functional block diagram of the code coverage analysis box of the monitor of FIG. 1.
Figure 4:
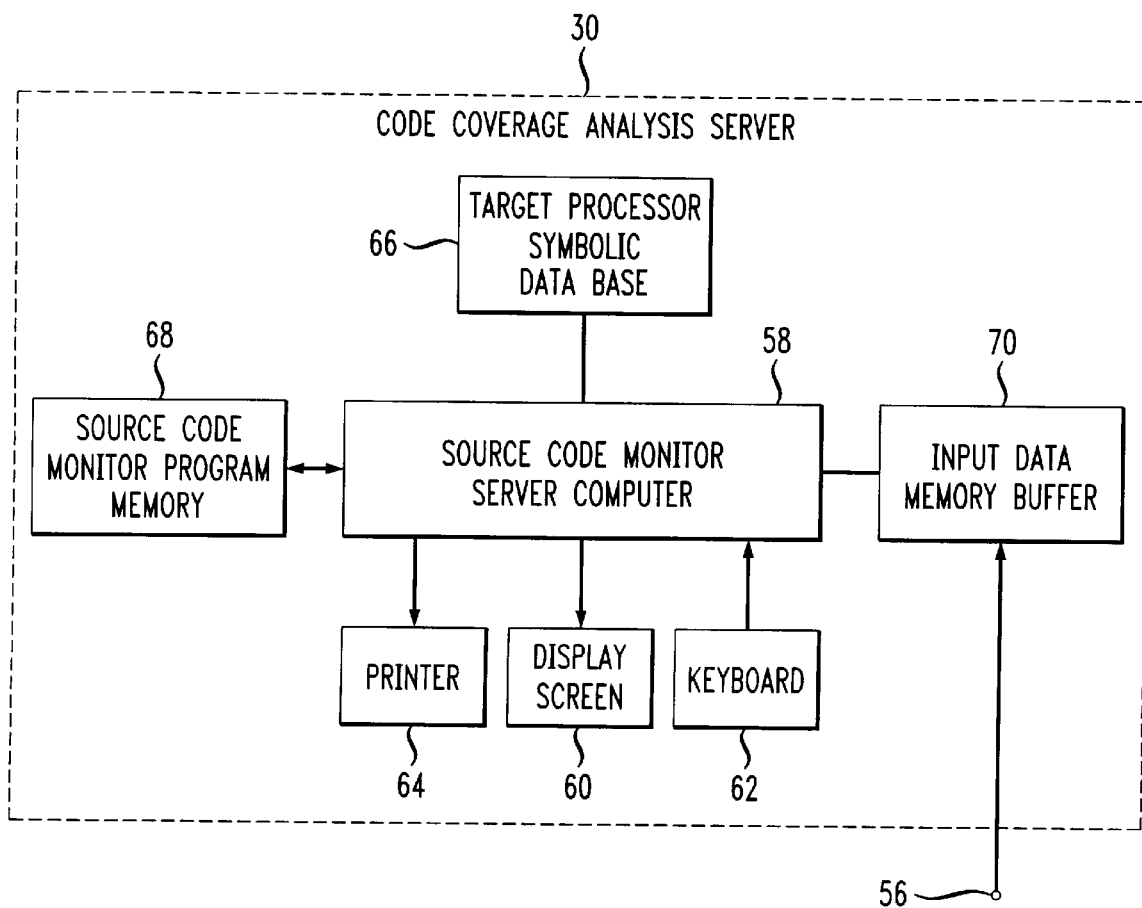
FIG. 4 is a functional block diagram of the code coverage analysis server of the monitor of FIG. 1.

Referring now to FIG. 4, the code coverage analysis server 30 is preferably a code monitor server computer 58 with a conventional display screen 60 for displaying the monitor output results, a keyboard 62, a printer 64 for printing the display of output results and source code monitor program memory 68. A model SPARC 5™ computer made by SUN MICROSYSTEMS® has sufficient capability to function as the code coverage analysis server. In addition, the server has a large capacity target processor symbolic data base 66, such as a source code symbol memory, for storage of symbol table monitoring information associated with the target processor 12 along with an associated support program. The large symbol code memory 66 is preferably contained on a removable storage medium such as a compact laser disc or the like with a storage capacity on the order of 16 B. A preferred embodiment of source code monitor software program of the present invention is stored in a source code monitor program memory 68. The hardware trace signals on the output 56 from the recirculating memory 54, FIG. 3, are selectively stored in the input data memory buffer 70.

Figure 5:
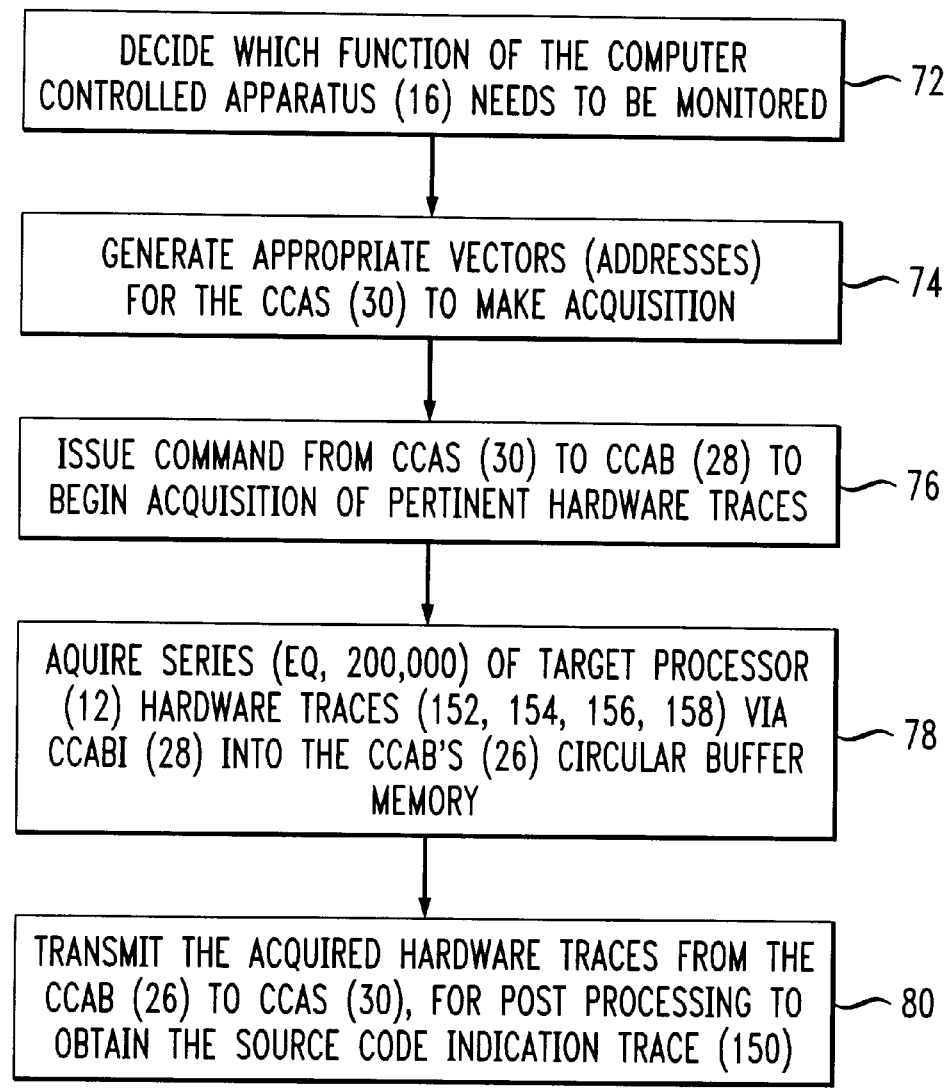
FIG. 5 is a flow chart of the preferred embodiment of the basic source code monitor computer program stored in the source code monitor program memory of FIG. 5 and used to control the monitoring operation and produce the monitor output.

The flow chart for the preferred embodiment of source code monitor software program of the present invention is shown in FIG. 5.

In step 72, prior to using the source code coverage monitor, the operator will decide what function of the computer controlled apparatus needs to be monitored. For example, in the telephonic industry, this apparatus may be in the 5ESS® switch indicated by a telephone off the hook.

In step 74, the operator will then determine the vectors of the function to be monitored, such as address, data, control, read, write, etc. This information is used to fill the trace request form on the CCAS 30.

In step 76, the source code coverage monitor then sends this trace request command to the CCAB 28 from the CCAS 30.

In step 78, the CCAB 28 then decodes the request and obtains a series of target processor 12 hardware traces such as those shown in FIG. 8A, via the CCAB 28 interface and stores them in the CCAB's 28 circular memory buffers 54.

In step 80, after the desired amount of traces, such as those shown in FIG. 8A, are obtained by the CCAB 28 and stored in circular memory buffer 54, the traces are then sent to the CCAS 30 for post-processing to obtain the source code information trace 150. An output such as the chart of FIG. 8A is therefore readily attained.

Figure 6A:
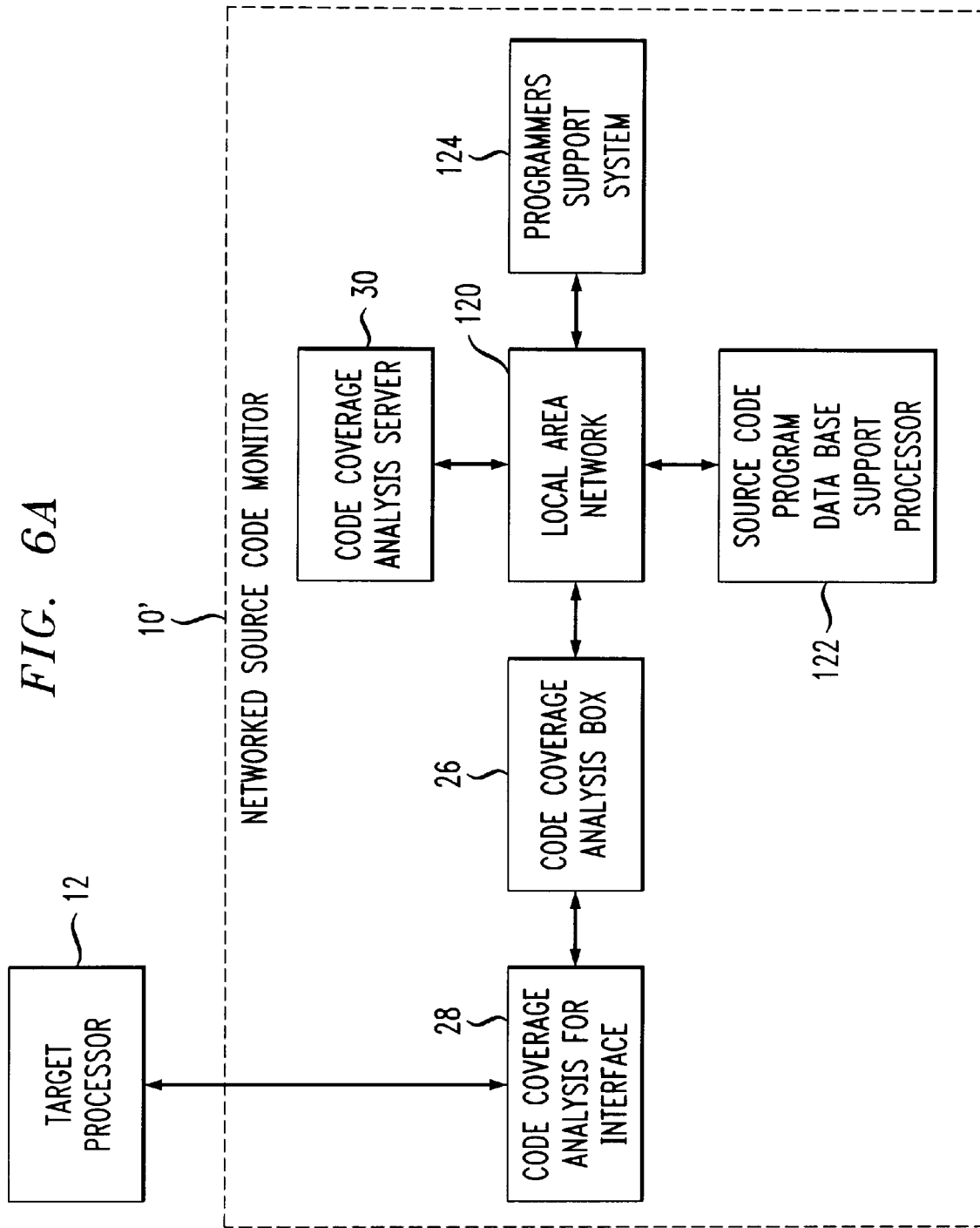
FIG. 6A is a functional block diagram of a preferred embodiment of a networked form of the source code monitor of the present invention.

Referring now to FIG. 6A, the preferred embodiment of the networked source code monitor 10' of the present invention is seen to include the interface circuit 28, the code coverage analysis box 26 and the code coverage analysis server 30 which are substantially identical in structure and function as described above with reference to FIGS. 1–4. However, unlike the basic source code monitor of FIG. 1, the code coverage analysis server 30 is coupled to the code coverage analysis box 26 via a local area network 120.

As in the source code monitor 10 of FIG. 1, the code coverage analysis server 30 functions as the control point for the user to perform the various functions shown in FIG. 5 such as "start trace", "stop trace", "display results", "print results", etc. and executes the source code monitor program necessary to match the hardware traces representing the actions taken by the target processor 12 with the software symbols indicating the various parts of the source code.

However, unlike the case in the basic monitor 10, in the networked monitor 10', the source code symbols are not necessarily stored in the target processor symbolic data base 66 exclusive to the source code monitor server computer 58 of FIG. 4. Instead, preferably, the source code symbols and associated actions are stored in a memory associated with a source code program data base support processor 122 which provide the appropriate source code symbol data and associated actions to the source code monitor server computer 58, FIG. 4, via the local area network 120. This source code program data base support processor 122 is specifically a model SPARC 2000™ computer made by SUN MICROSYSTEMS ® and has a memory capacity of 240 MB.

Figure 6B:
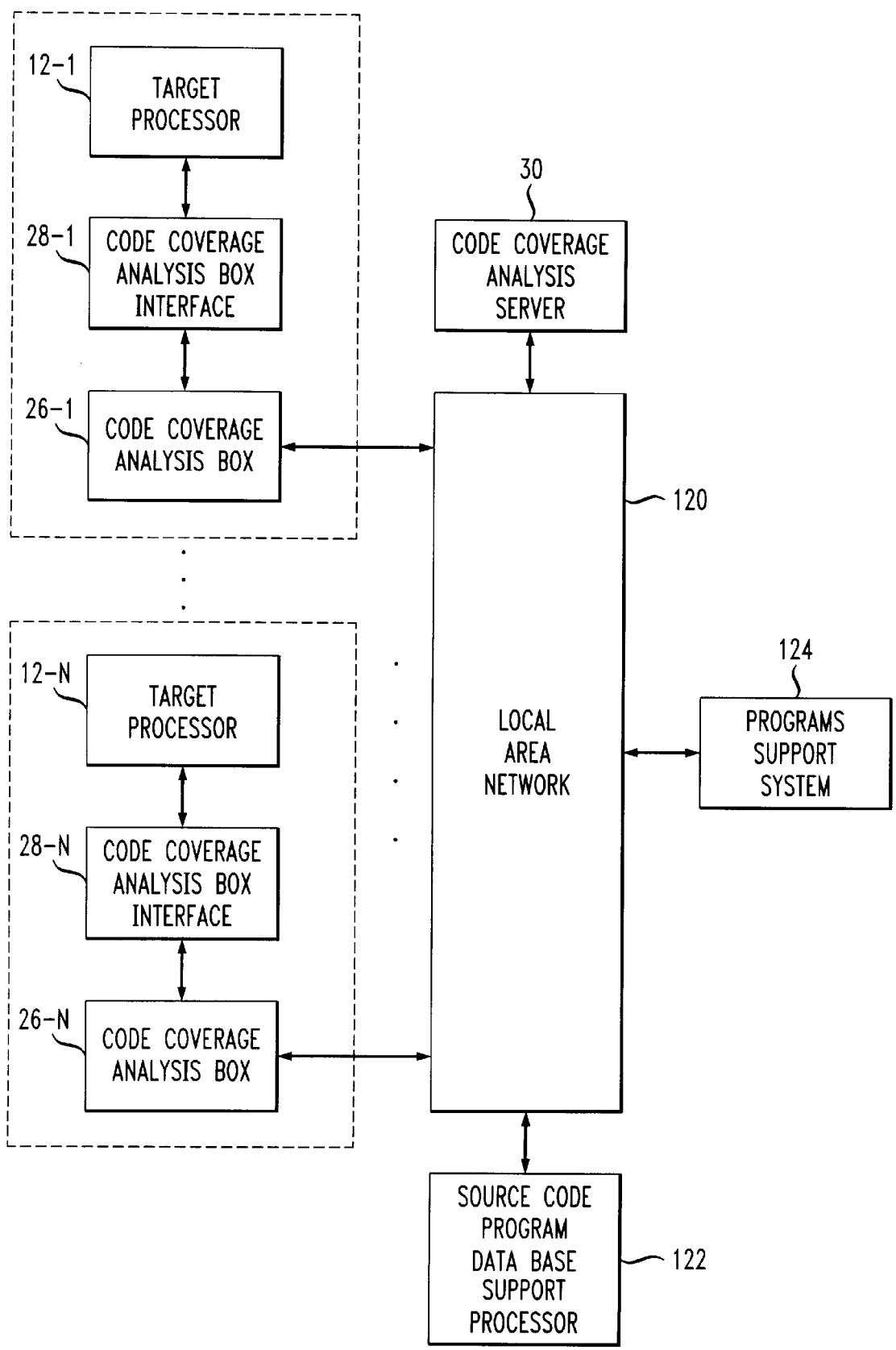
FIG. 6B is a functional block diagram illustrating use of the networked source code monitor of FIG. 6A to monitor source code of a plurality of remote target processors.

Another difference relative to the basic monitor 10, is that the networked monitor 10' preferably has a programmer's support system 124 coupled to the code coverage analysis server 30 via the local area network 120, such as AHMDAL® Model 5995 running VTS SYSTEM V™, version 2.12 operating system. As shown in FIG. 6B, importantly, with the networked source code monitor 10', the source code monitor server computer 58 is capable of off-site monitoring through the local area network 120 with a plurality of different target processors 12-1 through 12-N through associated on-site interface circuits 28-1 through 28-N and code coverage analysis boxes 26-1 through 26-N, respectively. The larger quantity of source code symbols which must be stored for comparison with a plurality of target processors 12-1 through 12-N instead of only one target processor 12 is handled via the off-site source code program data base support processor 122.

The matching function performed by the code coverage analysis server 30 in the networked monitor 10' is substantially performed in the same way as in the basic monitor 10 but additional software steps for communicating with multiple target processors 12-1 through 12-N, with the source code program data base support processor 122 and the program support system 124 are added as shown in the flow chart of FIG. 7.

Figure 7A:
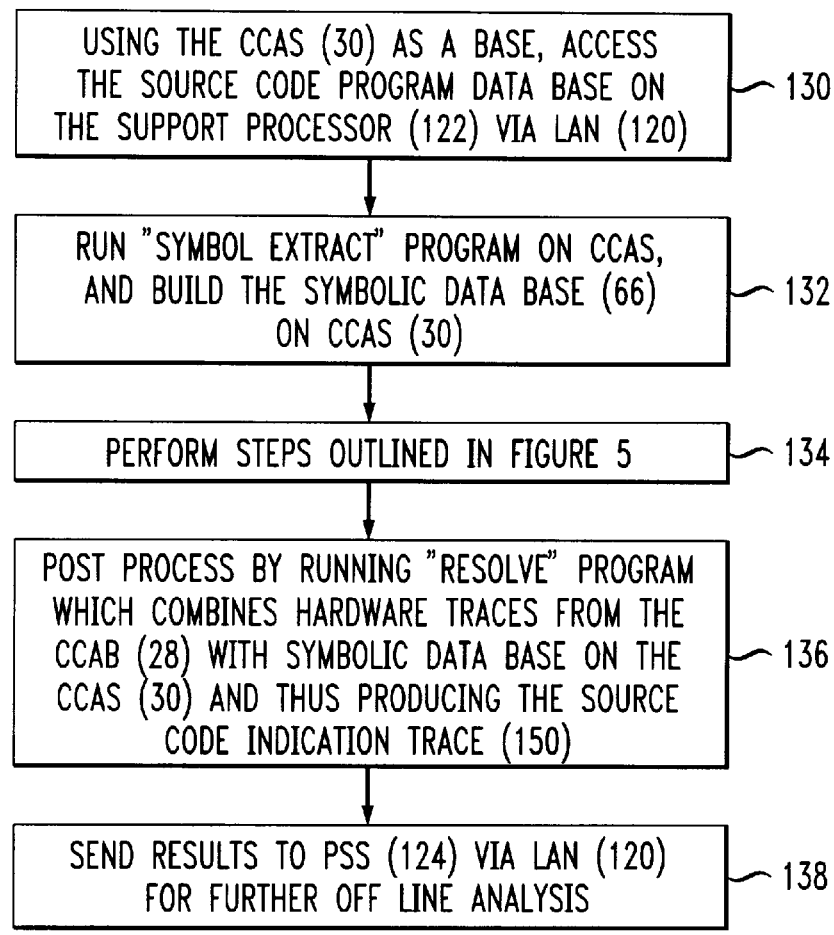
FIG. 7A is a flow chart of the preferred embodiment of the networked source code monitor computer program stored and executed by the code coverage analysis server of FIG. 6A.

Referring to FIG. 7A and FIG. 6A, one of the most powerful features of the source code software coverage monitor 10' is that it can decipher which functions the target processor 12 executes without interfering or modifying the underlying source code. This is accomplished by correlating the hardware trace information, such as those in columns, 152, 154, 156, 158, with the symbols from the source code database. In step 130, the operator accesses the CCAS 30 and activates a command that accesses the source code program database located on the support processor 122 via a LAN 120.

Next, at step 132, a symbol extract program is run which creates a symbolic database 66, which contains the names of the symbols along with the addresses in case of the functions; and values in case of the data structures. Steps 130 and 132 are only performed when a new software load is running. Step 134 performs the hardware trace acquisition described in FIG. 5 and in its accompanying text.

After the traces are acquired, at step 136 a resolve program is run which combines the traces from the CCAB 28 with the symbolic database 66 on the CCAS 30. The result of the combination produces the source code indication trace 150. The output of the source code software coverage monitor 10' is then viewed on the CCAS 30 console and in step 138 sent to archival storage or additional analysis to the programmers support system 124 via the LAN 120.

Figure 7B:
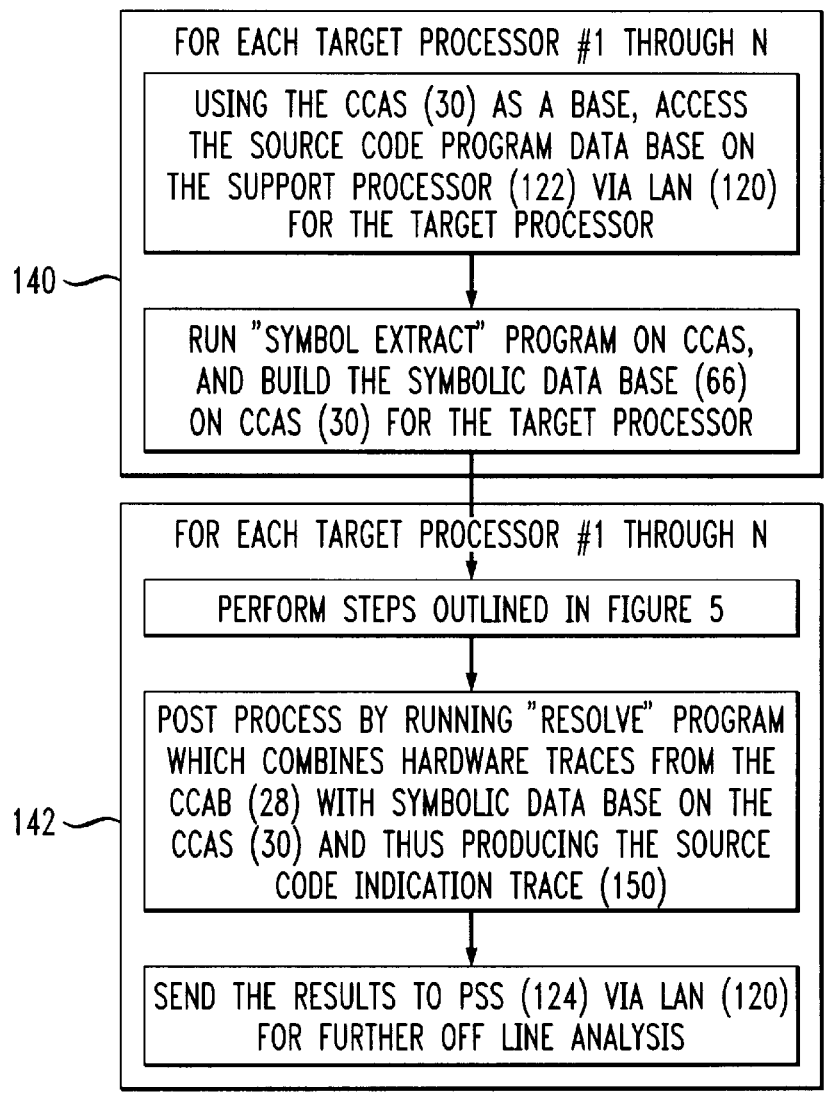
FIG. 7B is a flowchart of the preferred embodiment of the networked source code monitor computer program stored and executed by the code coverage analysis server of FIG. 6B.

With reference to FIGS. 7B and 6B, the source code software coverage monitor 10' is capable of tracking several target processors 12-N utilizing a common CCAS 30 via a LAN 120. In step 140 of FIG. 7B, the symbolic database 66 is created for each target processor 12-N. This is done by using the CCAS 30 as a base to access the source code program database on the support processor 122 via a LAN 120 for the target processor 12-N. In step 142, the steps of FIG. 5 and described in its accompanying text are performed to compare the symbols and generate the source code information trace 150 by running the resolve program. The resolve program combines the hardware traces from the CCAB 28 with the symbolic database 66 on the CCAS 30 to produce the indication traces 150. The results are then sent to the programmers support system 124 via the LAN 120 for further off-line analysis.

The result of using either the basic source code monitor 10 of FIG. 1 or the networking source monitor 10' of FIGS. 6A is production of source code monitoring data, such as shown in FIG. 8A, by the source code monitor server computer 58, FIG. 4, and display of that data selectively on the printer 64 and conventional display screen 60, such as shown in FIG. 8A. Referring to FIG. 8A, column 152 labelled "elapsed Time" shows the cumulative lapsed time since the occurring of the trigger action by the target processor 12 which initiated a monitoring cycle by the source code monitor 10 or 10'. Referring to FIG. 8A, each successive row of column 152 represents the elapsed time at the end of each successive transaction cycle of the target processor 12. Column 154, labelled transaction time, on the other hand, shows the length of time taken by the target processor 12 to perform each of the server transactions. Each entry is equal to the difference between the elapsed time entry on the same row in column 152 less the elapsed time entry on the immediately previous row.

The entries on each row of column 156 is a code word which indicates many aspects of the actions, or activity, taken by the target processor 12. This code word has the one-character fields f1, f2, and f3 and a two-character field f4 shown in FIG. 8A The field, the type of action, and the corresponding code letters and number are shown in FIG. 8B. Briefly, as seen in FIG. 8B, the phase of the bus is encoded in field f1; the read, write, etc. processor action is encoded in field f2; the size of the data moved across the bus is encoded in field f3 and the processor action on the bus including whether a user text or data or supervisor text or data or command function is being moved on the bus, is encoded in the two characters of field f4.

With reference again to FIG. 8A, column 158 represents the data value, if data is on the bus, and the address of other code on the bus.

The fifth column 160 is an indication of the object code being performed or executed during the associated transition cycle and selectively includes the matching line of source code indicated in brackets and is expressed in symbols, functions, and other high level abstract language and code representation of which part of the source code is being performed during the associated transaction cycle of the target processor 12 if there is, in fact, a match between the source code indication stored in input processor 122 or symbolic database 66. The actions of the target processor 12 are indicated in the columns, particularly columns 156 and 158, FIG. 8A are also displayed in conjunction with the associated part of the source code.

With reference to FIGS. 8A and 8B, one manner in which the source code monitor 10 operates is on the basis that any given software program has a finite universe of object code symbols associated with it that corresponds to all the instructions the processor can process. For example, a PENTIUM™ processor chip made by INTEL CORPORATION™. of Santa Clara, Calif., described in PENTIUM™ Processor User's Manual, Vol. 3, Architecture & Programming Manual, has a finite universe of about five hundred (500) instruction codes in its latest software issue. In the telephonic industry, a switch such as a 5ESS® switch has a universe of about five hundred thousand (500,000) symbols. The 5ESS® switch is manufactured by LUCENT TECHNOLOGIES® and described in "The 5ESS Switching System Architectural Overview", AT&T Technical Journal, vol. 64, No. 6 July/August 1985, pp. 1303–1564. For every action taken by the target processor 12 on its bus lines as indicated in columns 156 and 158, there should be an associated part of the object code. Accordingly, a universe of source code symbols representative of all the source codes and the associated actions are either preloaded into the source code symbol memory in the basic monitor unit 10 or are stored in the source code program data base support processor 127 and accessed by the server 30 of the network source code monitor 10'. In both monitors 10 and 10' instruction codes in the magnitude of thousands and even tens of thousands and the associated processor actions are stored. Preferably, the code coverage analysis server 30 employs a state machine to determine what action is occurring across a particular bus 20, 22, or 24 of the target processor 12. While the source code monitors 10 and 10' will have some, but not necessarily all, of the instruction codes possible to perform whatever function it is to perform, the universe of all the source code instruction codes possible are compared to the actions performed by the target processor 12. It is this universe of codes, against which the source code monitors 10 and 10', compares the actual action being taken by the target processor 12.

By way of example with particular reference to the first, or top, row, column 158 of FIG. 8A, the source code monitor 10 is programmed, in conjunction with the state machine mechanism, to understand that if the target processor 12 is currently operating at location 0170b640 to perform a read quad word user text function, then the object code being executed must be performing the Auptlchk function appearing on source code line 128 of the source code listing. On the other hand, if the target processor 12 is operating at location 0170b640 but is performing a write byte of supervisory mode text, then there will be a mismatch and there will be no correlation to the Auptlchk function and source code line 128. In such event of no match, no indication of a corresponding part of the source code is printed or displayed in column 160. This absence, of course, provides a clear indication that something has gone awry in the target processor 12.

As noted, users of the source mode monitor program can program onset and termination of a monitoring cycle in response to preselected triggering events. These triggering events can include any events of the type reported at columns 156, 158 and 159, in addition to passage of preselected time periods and transitional cycles to both start and stop acquisition of stored data in the recirculating memory.

Using the decoding table of FIG. 8B, the first entry of column 158 of FIG. 8A is read as "Address read of quad word of user text".

If the triggering event is detection of execution of a particular part of the object code, the triggering instruction is capable of being strategically placed anywhere within the object code to enable diagnosis of selected source code software activity only to eliminate other possible error-causing candidates in the system. For example, the source code monitor 10 is programmable to store X samples of data before occurrence of the triggering event and Y samples after the occurrence of triggering event. In this manner, when the target processor 12 malfunctions as evidenced, for example, by failure of the end function, parts of the object code are available for diagnosis. In microprocessors with embedded software, the microprocessor often does not show signs of malfunction until long after the problem originated. Therefore, it is critical to debugging wild-write errors to enable the program to look far back into the object code to find the error and for this reason the recirculating memory has such large capacity.

As should be appreciated, the source code monitor 10 facilitates tracking software and hardware at any state of the target processor 12. For example, many 32-bit processors used with embedded software programs operate in both user and supervisory modes. Often times, the system will crash as the operating system, or OS, transitions the target processor 12 from user to supervisory modes and vice versa. This will occur at times when the OS is running off a target processor 12 that is of a higher speed than for which it was originally designed. Advantageously, the source code monitor 10 facilitates diagnosing such a problem because the output of column 156, field f4 tracks whether the source code is supervisory code or user code. This enables analyzing the event occurring between transitions of user to supervisory codes and vice versa.

Referring to FIG. 9, this capability is illustrated. The example illustrates software coverage of embedded processor activity in a telephone switching system making transition form supervisor mode of operation, i.e. operating system, to user mode, i.e. program. At the time 0.639110 ms time the target processor 12 is in the supervisor mode (address read of quad word of supervisor text—ARQST), executing line 390 of operating system function Osdisp [390]. After a series of executed statements, at time 0.642200, the line 27 of user function Oslites[27] is being executed.

In keeping with another aspect of the invention, the integration of many operating modules into a central system is facilitating. For example, in one department of an office, the office may be wired only for regular telephone service. Later as the office upgrades, the office may need ISDN (integrated services digital network) lines, video lines, or trunk transfer capabilities. An ISDN network is a network that provides end-to-end connectivity to support a wide range of services, including voice and nonvoice services, to which users have access by a set of standard multipurpose customer interfaces. Because each addition may be written in a different kind of software code, integration is difficult.

Figure 10:
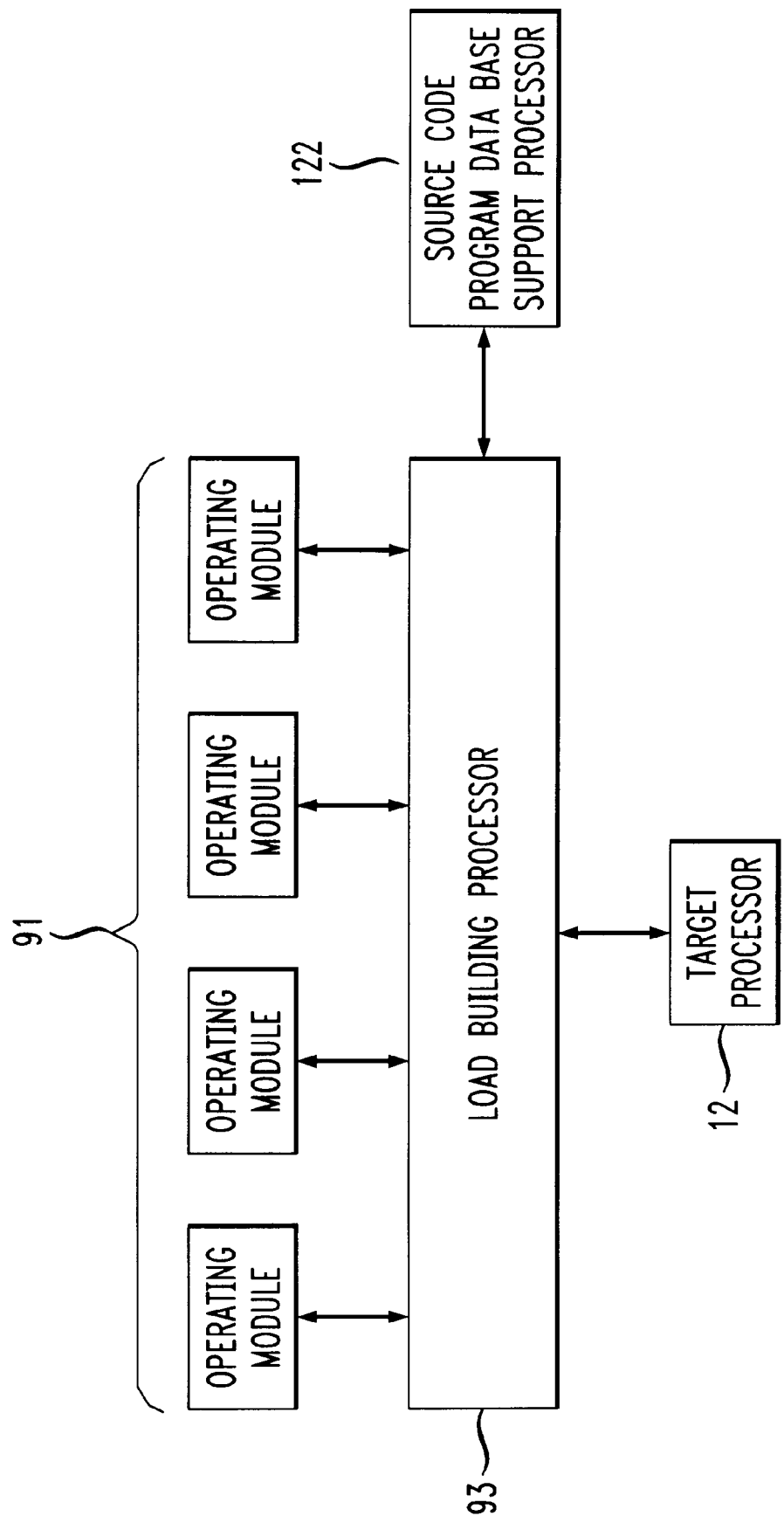
FIG. 10 is a functional block diagram of a multimodule programming application in which the monitor is capable of being used.

Referring to FIG. 10, in some applications, a load building processor 91 is connected to a plurality of operating modules 91 at which are produced different modules, or sections, of program source code. The source code of the individual modules 90 are submitted to the load building processor 93 where they are linked together into composite software load to create a composite universe of possible instruction and object codes available for the target processor 12 with different lines of code associated with the different modules. The composite software load is installed into the main program memory of the target processor 12. In keeping with the invention, this composite software load is also loaded to the source code program data base support processor 122 and is used to build the entire universe of symbols including software function names, transfer vector names, data structure names and any other software construct that may be present in the totality of software modules 91. In this way, monitor 10' is able to show errors occurring in the source code of multiple operating modules 91 and can determine in which modules the errors occur.

Another aspect of the current invention relates to setting up pseudo break-points in the source code monitor 10. Unlike break-points, which interject into the source code an instruction digit or the like to mark where the object code may be interrupted by external intervention or by a monitoring routine during execution of the object code, monitors 10 and 10' are noninterrupted, or noninterfering, and do not require insertion of an instructions to mark break points in the source code. Instead, a pseudo break point defined by occurrence of detection of execution of a preselected part of the object code will trigger the monitor to take action normally associated with the instruction of a real break point. As with the disadvantages of other software diagnostic tools, the current invention is advantageous in generating pseudo break points in a noninterfering (i.e. passively) manner. In the past, the interference caused by break points inserted into the target processor software potentially caused intolerable delays in program execution and program degradation.

The time stamp capabilities of the monitor also provide a great advantage. Because the current invention monitors the timing of execution of object code, the intervals between certain events are calculated. Preferably, the timing signal generation circuit 38 of the interface circuit 28, FIG. 2A, and the code coverage analysis box 26, FIG. 3, used in the monitors 10 and 10' are sensitive to five hundred picoseconds, so the length of a function or the duration between functions can be ascertained precisely in real-time. The computation of time intervals are calculated from the elapsed time signals.

In addition to the information described above with reference to FIGS. 8A and 8B, source code monitor 10 is also programmable to add more columns to the chart of FIG. 8A to include the time between preselected events using the data from columns 152 and 154.

In addition, the monitors 10 and 10' can be used in diagnosing the target processor's 12 hardware. Once the monitor starts its diagnostic routine, the target processor 12 is selectively monitored, for example by displaying the waveform of the target processor 12, and thus by cross-referencing when the target processor 12 fails in relation to the object code executed, accurate diagnosis of the waveforms can be obtained and examined. This is advantageous in determining whether the fault occurs in the source code monitor 10 or the target processor 12 itself This capability is of great assistance when debugging software running on a new hardware platform.

Those skilled in the art who now have the benefit of the present disclosure will appreciate that the present invention may take many forms and embodiments. Some embodiments have been presented and described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. An apparatus for monitoring the execution of an object coded computer program by a processor, comprising:

means for passively detecting the actions taken by the processor while executing the object coded program;

means responsive to said passively detecting means for determining during execution of the object program by the processor if there is a match between the actions as detected and an associated part of the object code; and means responsive to said match determining means for displaying an indication of the actions performed and, if there is a match, an indication of the associated part of the object code.

2. The code monitoring apparatus of claim 1 in which said displaying means comprises means responsive to the determining means determining there is not a match to provide an indication that there is no part of the object code associated with the detected actions.

3. The code monitoring apparatus of claim 1 in which said processor performs communication actions on an address bus, a data bus and a control bus, and said detecting means comprises an interface circuit for making an external communication link with and producing an interface output signal representative of signals on at least one of the address bus, the data bus and the control bus.

4. The code monitoring apparatus of claim 3 in which said interface is in electrical communication with all of the address bus, data bus and control bus.

5. The code monitoring apparatus of claim 3 in which said determining means comprises:

means for monitoring the interface output signal; and means for determining if there is a match between the interface output signals and an associated part of the object code.

6. The code monitoring apparatus of claim 3 comprising means for analyzing the interface output signals to produce coded action signals representative of the action taken by the processor.

7. The code monitoring apparatus of claim 6 in which said analyzing means comprises means for producing a signal representative of the time at which the actions are taken relative to the occurrence of a trigger event.

8. The code monitoring apparatus of claim 6 in which said detecting means comprises an analysis server responsive to the coded action signals from the means for analyzing to determine if there is a match to a corresponding part of the object code.

9. The code monitoring apparatus of claim 8 in which said analysis server comprises:

a memory for storing symbols representative of an object code program together with associated actions which should be performed in accordance with the object code;

means for comparing the stored actions which should be taken with the actions actually taken to determine if there is a match; and means for displaying the symbols representative of associated code if there is a match.

10. The code monitoring apparatus of claim 8 in which the interface circuit is at a target processor site together with the means for analyzing and including, a network for interconnection the analysis server at a remote site with the means for analyzing.

11. The code monitoring apparatus of claim 10 comprising:

another target processor interconnected with another interface circuit and an action analyzer; and means for interconnecting the analysis server at the remote site with the action analyzer to enable monitoring both the one and the other target processor.

12. The code monitoring apparatus of claim 8 comprising:

a source code program data base support processor for storing and selectively providing symbols for an operating program for a plurality of different processors; and said analysis server includes means for communicating with said source code program data base support processor through a network to produce different sets of symbols representative of the object code of different processors and associated processor actions for comparison.

13. The code monitoring apparatus of claim 1 including means for selectively turning on and turning off the determining means in response to occurrence of a preselected trigger event comprising the occurrence of a preselected processor action.

14. The code monitoring apparatus of claim 1 including means for selectively turning on and turning off the determining means in response to occurrence of a preselected trigger event comprising the occurrence of a preselected address appearing on an address bus.

15. The code monitoring apparatus of claim 1 including means for selectively turning on and turning off the determining means in response to occurrence of a preselected trigger event comprising the determination of a match to a preselected part of the object code.

16. The code monitoring apparatus of claim 1 including means for selectively turning on and turning off the determining means in response to occurrence of a preselected trigger event comprising the passage of a preselected amount of time.

17. A method of monitoring execution of an object coded program stored in a computer, said computer having a processor for performing actions in accordance with associated parts of the object coded program, comprising the steps of:

passively detecting the actions being performed by the processor during execution of the object coded program;

determining during execution of the object coded program by the processor if there is a match between the actions being performed by the processor as detected during said step of detecting passively with an associated part of the object code; and displaying, if there is a match, an indication of the actions performed by the processor in conjunction with an indication of the associated part of the object code.

18. The method of claim 17 comprising the step of displaying, if there is not a match, an indication of the action performed in conjunction with an indication that there is not a match.

19. The method of claim 18 in which said indication that there is not a match is the absence of an indication of a part of the object code associated with the indication of the action.

20. The method of claim 17 in which said step of displaying comprises the steps of:

predesignating a preselected processor action as a monitoring trigger event; and displaying an indication of the actions taken and an indication of the object code associated with the actions taken before and after occurrence of each predesignated monitoring trigger event.

21. The method of claim 17 in which the actions performed by the processor comprises communication actions taken on an address bus of the processor, and said step of determining comprises the steps of:

monitoring the communication actions on the address bus; and determining if there is a match between an address on the address bus being monitored and an associated part of the object code program.

22. The method of claim 21 in which said step of displaying an indication of the associated part of the object code comprises displaying an indication of a function to be performed in accordance with the object code.

23. The method of claim 17 in which the actions performed by the processor includes communication actions taken on an address bus, a data bus and a control bus, and said steps of determining comprises the steps of:

monitoring the actions on the address bus, the data bus and the control bus; and determining if there is a match between the composite communication action on the address bus, the data bus and the control bus and an associated part of the object code program.

24. The method of claim 23 in which said step of displaying an indication of the associated part of the object code comprises the step of displaying a source code line number and an indication of the function to be performed in accordance with a source code instruction at said source code line.

25. The method of claim 24 in which said step of displaying comprises the step of displaying whether the function to be performed is one of a read data function or a write data function.

26. The method of claim 24 in which said object code comprises user code and supervisor code, and said step of displaying comprises the step of displaying whether the associated action is being performed pursuant to the user code or the supervisor code.

27. The method of claim 26 in which said step of displaying comprises the step of displaying whether the function to be performed is one of a read data function or a write data function.

28. The method of claim 24 comprising:

the step of measuring the elapsed time since beginning of a monitoring cycle, and in which said step of displaying includes the step of displaying the elapsed time in conjunction with the associated part of the object code.

29. The method of claim 28 comprising:

the step of determining the intervals of time between execution of successive lines of object code; and said step of displaying includes the step of displaying the intervals of time in conjunction with the indication of the associated part of the object code.

30. The method of claim 24 comprising the step of determining the intervals of time between execution of successive lines of object code; and said step of displaying includes the step of displaying the intervals of time in conjunction with the indication of associated part of the object code.

31. The method of claim 23 comprising the step of determining and displaying the phase of the bus operation.

32. The method of claim 23 comprising the step of determining and displaying the nature of the action on the bus.

33. The method of claim 23 comprising the step of determining and displaying the size of data being moved on the bus.

34. The method of claim 23 comprising the step of determining and displaying the text/data-type command function being performed on the bus.

35. The method of claim 23 in which said steps of determining and displaying comprises the steps of determining and displaying:

(a) the phase of the bus operation;

(b) the nature of the action on the bus;

(c) the size of the data being moved on the bus; and (d) the text/data-type command function being performed on the bus.

36. The method of claim 35 in which the items (a), (b), (c) and (d) are displayed in a code having four fields of code of no more than two characters long representative of the items (a), (b), (c) and (d), respectively.

37. The method of claim 17 comprising the step of displaying in conjunction with each indication of the action taken and the associated part of the object code, an indication of timing of the action taken.

38. The method of claim 37 in which the indication of timing comprises an indication of the time elapsed since initiation of monitoring.

39. The method of claim 37 in which the indication of timing comprises an indication of the time duration taken for the processor to perform each action monitored.

40. The method of claim 17 in which said step of displaying comprises the steps of:

temporarily storing the indication of a sequence of the actions performed by the processor as the sequence of actions are performed;

detecting when a preselected trigger event has been performed by the processor; and permanently storing for display the indication of the performed sequence of actions being temporarily stored in response to occurrence of the preselected trigger event being detected.

41. The method of claim 40 in which said step of permanently storing comprises the step of permanently storing the sequence of performed actions occurring both before and after detection of the preselected trigger action.

42. The method of claim 40 in which said step of temporarily storing is performed with a recirculating memory.

* * * * *